US008577763B2

(12) United States Patent
Garcia et al.

(10) Patent No.: US 8,577,763 B2
(45) Date of Patent: Nov. 5, 2013

(54) METHOD OF CONVERTING CASH INTO VIRTUAL CASH AND LOADING IT TO MOBILE PHONE CASH ACCOUNT

(75) Inventors: Rodell Garcia, Mandaluyong (PH); Raul Macatangay, Mandaluyong (PH); Mickey Cayetano, Mandaluyong (PH); Grace Reyes, Mandaluyong (PH); Jewel Dimaano, Better Living Subd P'que (PH); Marlowe Pongol, Mandaluyong (PH); Sheila Jimenez, Mandaluyong (PH); Melenita Quito, Mandaluyong (PH); Jenny Villanueva, Mandaluyong (PH); Justine Camacho, Mandaluyong (PH); Glenn Mendoza, Mandaluyong (PH); Kaytee Reyes, Mandaluyong (PH); Shydee Buizon-Tiambeng, Mandaluyong (PH); Jessica A. Reyes, Mandaluyong (PH); Joanne Avendano, Pasig (PH); Verna Quinton, London (GB); Alain Bustamante, Mandaluyong (PH); Louie Domingo, Mandaluyong (PH); Fernando P. Teodoro, Mandaluyong (PH); Richard Matotek, Mandaluyong (PH); Andrew Barnham, Ballarat (AU); Justin Ho, Singapore (SG)

(73) Assignee: G-Xchange, Inc., Melbourne (AU)

( * ) Notice: Subject to any disclaimer, the term of this patent is extended or adjusted under 35 U.S.C. 154(b) by 217 days.

(21) Appl. No.: 12/069,532

(22) Filed: Feb. 11, 2008

(65) Prior Publication Data
US 2009/0177578 A1    Jul. 9, 2009

Related U.S. Application Data

(63) Continuation of application No. PCT/PH2006/000008, filed on May 23, 2006.

(30) Foreign Application Priority Data

Aug. 23, 2005  (PH) ................................ 1-2005-0421

(51) Int. Cl.
*G06Q 40/00*    (2012.01)

(52) U.S. Cl.
USPC ................................................ 705/35; 705/39

(58) Field of Classification Search
USPC ................................................ 705/39, 16, 35
See application file for complete search history.

(56) References Cited

U.S. PATENT DOCUMENTS 6,957,342  B2 *  10/2005  Vatanen ........................ 713/192
2003/0001010  A1 *   1/2003  Schmidt et al. ............... 235/385

(Continued)

OTHER PUBLICATIONS

Lefebvre, Philippe J. "Digital money—a view from the European Commission"; European Business Review; 1999: 242-256.*

(Continued)

*Primary Examiner* — Edward Chang
(74) *Attorney, Agent, or Firm* — Abe Hershkovitz; Hershkovitz & Associates PLLC

(57) ABSTRACT

A method of receiving virtual cash from an outlet through a mobile phone including the steps of: —customer requesting cash-out at an outlet; —customer showing identification and filling out a form; —frontliner accessing the device and keying in command containing customer's amount of cash-out and sending this to telco; —telco verifying that customer's mobile phone is registered with the telco's cash product services and that the amount of cash-out is available in the customer's mobile phone cash account and sending information to the device of the frontliner of the outlet; —frontliner of the outlet verifying that customer is registered with telco's cash product services and advising the customer of the unique transaction code; —customer paying cash-out fee; —customer keying in "CASHOUT" cash product command containing his PIN, amount to be cashed out, and his mobile phone number; —sending this command to telco; —outlet's device receiving a confirmatory message from telco of cash product service transfer; —customer receiving a SMS acknowledgment from telco of the completion of the cash product service; —customer getting virtual cash from the outlet; —outlet's device receiving an acknowledgment of the completion of the transaction and confirmation number from telco in a format matching the outlet's device.

2 Claims, 2 Drawing Sheets

(56) References Cited

U.S. PATENT DOCUMENTS

| | | | |
|---|---|---|---|
| 2004/0030601 A1* | 2/2004 | Pond et al. | 705/16 |
| 2004/0098740 A1* | 5/2004 | Maritzen et al. | 725/27 |
| 2005/0199709 A1* | 9/2005 | Linlor | 235/380 |
| 2006/0287004 A1* | 12/2006 | Fuqua | 455/558 |
| 2007/0087815 A1* | 4/2007 | Van Luchene | 463/25 |

OTHER PUBLICATIONS

Business Wire; "Mondex on MULTOS Wins Highest Security Rating Ever for a Commercia"; Business Editors and Technology Writers; Sep. 9, 1999: 1.*

* cited by examiner

METHOD OF CONVERTING CASH INTO VIRTUAL CASH AND LOADING IT TO MOBILE PHONE CASH ACCOUNT

RELATED APPLICATIONS

This is a continuation patent application that claims priority to PCT patent application number PCT/PH2006/000008, filed on May 23, 2006, which claims the benefit of Philippines application no. 1-2005-000421, filed on Aug. 22, 2005, the entireties of which are herein incorporated by reference.

FILED OF INVENTION

The invention relates in general to mobile phones but more particularly to a method of receiving and transmitting data regarding individual financial transactions.

DESCRIPTION OF THE PRIOR ART

Financial transactions are commonly conducted using a wide variety of credit and debit cards. The transactions may be on-line or off-line retail purchases to withdraw cash or make financial transfers using automated teller machines or self-service terminals.

With the advent of mobile phones, the following transactions, namely: (a) balance inquiry, (b) airtime loan transfers, (c) funds transfer from one account or another account where both accounts are maintained by one bank, and (d) bills payment where funds are transferred from one account to another account where both accounts are maintained by one bank, and (d) bills payment where funds are transferred from one account to another account where both accounts are maintained by one bank, are completed by sending Short Messaging Service (SMS) commands using mobile phones.

However, the present mobile phones are not yet used for financial transfers from one person (entity) and another (entity) or for purchase of goods or services.

SUMMARY OF THE INVENTION

It is the primary aim of the present invention to provide a method of converting cash into virtual cash and loading it to a mobile phone cash account by using a telephone company's (telco) cash product services. The virtual cash may be used for financial transfers and the purchase of goods or services.

Another object is to provide a method of loading the mobile phones with virtual cash from a telco's outlet or a $3^{rd}$ party (outlet) through a range of devices including mobile phone, web portal, point-of-sale terminal (device) using telco's cash product services.

The virtual cash can be converted back to cash or be used to purchase goods or services with much more ease than going to a bank and withdrawing money.

Still an object is to provide a novel method using the mobile phones in purchasing goods or services wherein transaction data is simultaneously transferred and recorded to and on the customer's mobile phone and the outlet's device.

BRIEF DESCRIPTION OF THE DRAWINGS

These and other objects and advantage of the present invention will become apparent upon reading the following detailed description taken in conjunction with the appended drawings, wherein.

DETAILED DESCRIPTION OF THE PREFERRED EMBODIMENTS

Figure 1:
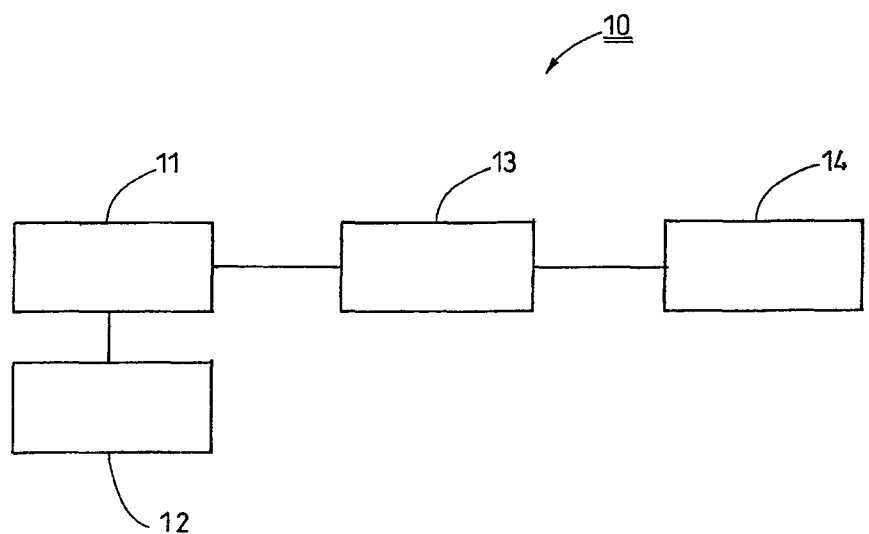
FIG. 1 is a block diagram of the elements involve in carrying out the method.
Figure 2:
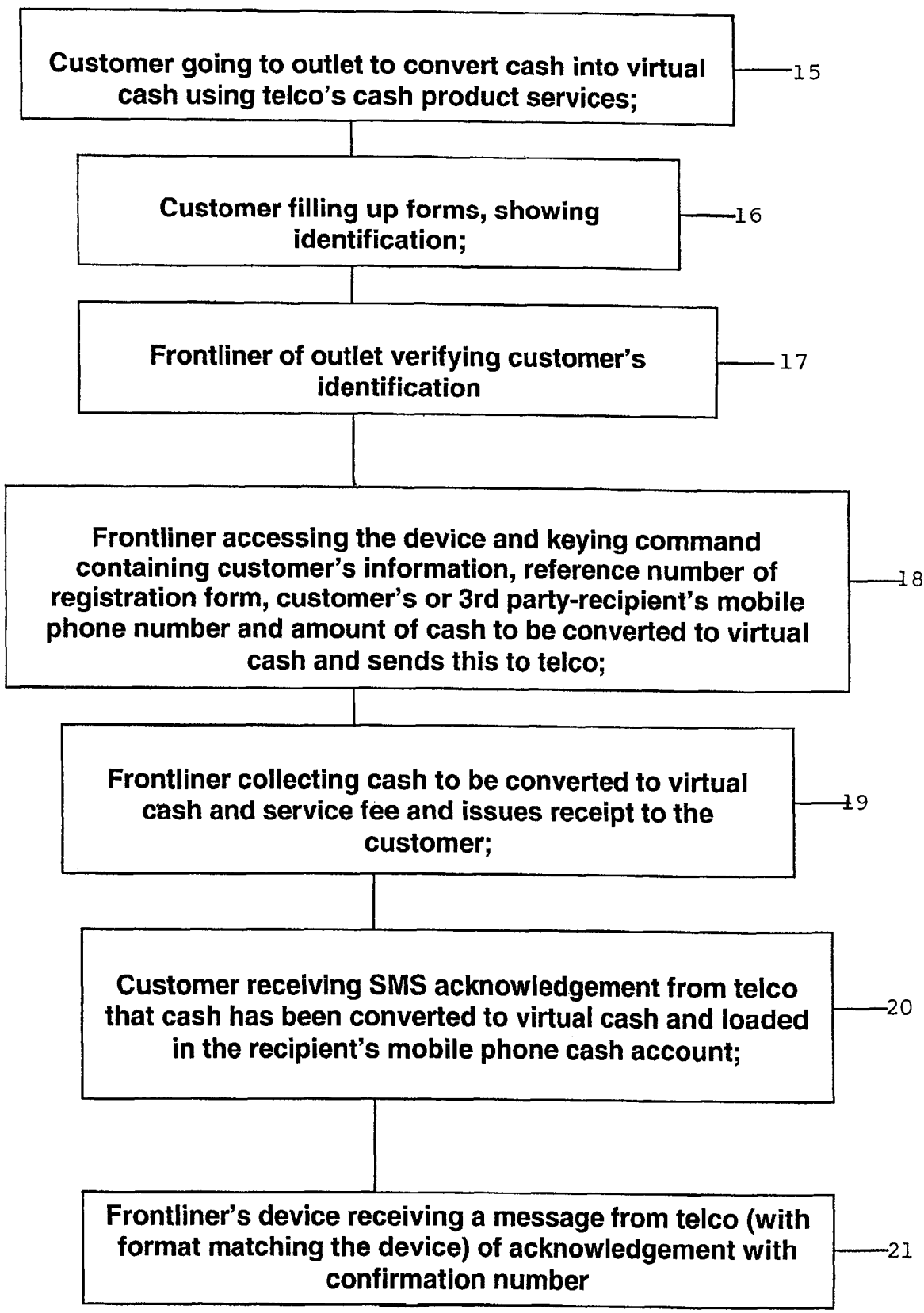
FIG. 2 is a flow chart of the method.

Referring now to several views of the drawings wherein like reference numerals designate same parts throughout, the method of converting cash into virtual cash and loading it to the customer's mobile phone or $3^{rd}$ part recipient's mobile phone using telco's cash product services is generally designated as 10.

The present invention involves a customer 11, his mobile phone or 3rd party's mobile phone 12, an outlet 13 and a teleco 14 and are all united by software.

The customer 11 goes in step (15) to the outlet 13 to convert cash into virtual cash and loads it to the customer's mobile phone or a $3^{rd}$ party-recipient's mobile phone 12 using telco's cash product service.

The customer 11 fills out a registration form in step (16) and submits his identification.

Frontliner of the outlet 13 verifies in step (17) customer's information and identification.

Frontliner accesses the device and keys in command in step (18) containing customer's information, reference number of the registration form, customer's or $3^{rd}$ part-recipient's mobile phone number and amount of cash to be converted to virtual cash and sends this to telco 14.

Frontliner collects in step (19) cash to be converted to virtual cash and the service fee and issues receipt to the customer 11.

Customer 11 receives in step (20) an SMS acknowledgment from telco 14 that the cash has been converted to virtual cash and loaded in the recipient's mobile phone cash account using telco's cash product service transfer.

Frontliner receives in step (21) an acknowledgment and confirmation number from telco 14 in a format that corresponds to the outlet's device.

The customer's mobile phone or $3^{rd}$ party recipient's mobile phone 12 is loaded with virtual cash, which may be used for other financial transactions.

We claim:

1. A method of converting cash into virtual cash loaded into a mobile phone cash account using a telco's cash product services, the method comprising:
   - a customer going to an outlet to convert cash into virtual cash loaded into a third-party recipient's mobile phone using the telco's cash product services;
   - the customer filling out a registration form, showing identification;
   - a frontliner of the outlet verifying the customer's identification;
   - the frontliner accessing a device, keying a command containing the customer's information, a reference number of the registration form, the third-party recipient's mobile phone number, and an amount of cash to be converted to virtual cash into the device, and sending the command to the telco;
   - the frontliner collecting cash to be converted to virtual cash, and a service fee, and issuing a receipt to the customer;
   - the customer receiving a SMS acknowledgement from the telco to the customer's mobile phone that the cash has been converted to virtual cash and loaded in the third-party recipient's mobile phone; and
   - the frontliner's device receiving a message from the telco with a format matching the device for an acknowledgement with a confirmation number.

2. A method of converting cash into virtual cash loaded into a mobile phone cash account using a telco's cash product services, the method comprising:

- a customer going to an outlet to convert cash into virtual cash loaded into the customer's mobile phone using the telco's cash product services;
- the customer filling out a registration form, showing identification;
- a frontliner of the outlet verifying the customer's identification;
- the frontliner accessing a device, keying a command containing the customer's information, a reference number of the registration form, the customer's mobile phone number, and an amount of cash to be converted to virtual cash into the device, and sending the command to the telco;
- the frontliner collecting cash to be converted to virtual cash, and a service fee, and issuing a receipt to the customer;
- the customer receiving a SMS acknowledgement from the telco to the customer's mobile phone that the cash has been converted to virtual cash and loaded in the customer's mobile phone; and
- the frontliner's device receiving a message from the telco with a format matching the device for an acknowledgement with a confirmation number.

\* \* \* \* \*